US012789900B2

(12) United States Patent
Maeda

(10) Patent No.: US 12,789,900 B2
(45) Date of Patent: Nov. 10, 2026

(54) VEHICLE FRONT STRUCTURE

(71) Applicant: SUBARU CORPORATION, Tokyo (JP)

(72) Inventor: Akihiro Maeda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 210 days.

(21) Appl. No.: 18/981,830

(22) Filed: Dec. 16, 2024

(65) Prior Publication Data

US 2025/0115194 A1 Apr. 10, 2025

Related U.S. Application Data

(63) Continuation of application No. PCT/JP2023/018760, filed on May 19, 2023.

(51) Int. Cl.
*B60R 5/02* (2006.01)
*B60R 7/02* (2006.01)
(Continued)

(52) U.S. Cl.
CPC .............. *B62D 21/152* (2013.01); *B60R 5/02* (2013.01); *B60R 7/02* (2013.01); *B62D 25/087* (2013.01)

(58) Field of Classification Search
CPC .. B62D 21/152; B62D 25/087; B62D 25/082; B62D 21/15; B62D 25/808; B62D 25/085; B60R 5/02; B60R 5/04; B60R 7/02; B60R 2011/0038; B60R 2011/0082; B60R 2021/0004
(Continued)

(56) References Cited

U.S. PATENT DOCUMENTS 12,365,288 B2 * 7/2025 Mellergård ............... B60R 5/00
2016/0236718 A1 8/2016 Tatsuwaki et al.
(Continued)

FOREIGN PATENT DOCUMENTS

JP 2016-150685 A 8/2016
JP 2016-150726 A 8/2016
(Continued)

OTHER PUBLICATIONS

International Search Report (with English translation) and Written Opinion dated Jul. 25, 2023, from International Application No. PCT/JP2023/018760, 9 pages.

*Primary Examiner* — Roger L Pang
(74) *Attorney, Agent, or Firm* — Rimon P.C.

(57) ABSTRACT

A vehicle front structure includes: left and right side frames; an upper support positioned above the side frames; upper sides fastened to left and right ends of the upper support; upper frames fastened to upper sides' rear ends; a hood that opens/closes a housing space; and a frunk disposed in the housing space and attached to the side frames. When an impact from a front side is applied, bottom surface side beads at a bottom surface of the frunk bend the bottom surface so as to protrude downward, and side surface side beads side surfaces on both left and right sides of the frunk bend the side surfaces so as to protrude outward in a left-right direction. A position of a bottom surface side bead and a side surface side bead in a front-rear direction coincides with that of a fastening point between a upper side and a upper frame.

4 Claims, 9 Drawing Sheets

(51) Int. Cl.
*B62D 21/15* (2006.01)
*B62D 25/08* (2006.01)

(58) Field of Classification Search
USPC ......... 296/24.3, 24.45, 37.1, 187.09, 193.09, 296/203.02
See application file for complete search history.

(56) References Cited

U.S. PATENT DOCUMENTS

| | | | | |
|---|---|---|---|---|
| 2021/0284242 | A1 | 9/2021 | Yamaoka | |
| 2025/0153677 | A1 * | 5/2025 | Maeda | B62D 25/081 |

FOREIGN PATENT DOCUMENTS

| | | | |
|---|---|---|---|
| JP | 5992974 | B2 | 9/2016 |
| JP | 2021-146741 | A | 9/2021 |

* cited by examiner

VEHICLE FRONT STRUCTURE

CROSS-REFERENCE TO RELATED APPLICATIONS

This application is continuation of International Application No. PCT/JP2023/018760, filed on May 19, 2023, the entire contents of which are hereby incorporated by reference.

BACKGROUND

The disclosure relates to a technical field of a vehicle front structure in which a frunk is accommodated in a housing space positioned on a front side of a vehicle cabin.

Examples of vehicles such as an automobile include a vehicle in which an engine and a drive motor are accommodated as a driving source in a housing space positioned on a front side of a vehicle cabin, and a frunk capable of storing a stored item is accommodated in the housing space (for example, Japanese Unexamined Patent Application Publication (JP-A) No. 2021-146741). The frunk accommodated in the housing space is covered with a hood (bonnet) from above.

In the vehicle as described above in which the frunk is accommodated in the housing space, since the frunk is accommodated on the front side of the vehicle cabin, in the event of a collision (frontal collision) of the vehicle, when the frunk is subjected to an impact from the front side and is moved rearward, safety of a passenger present in the vehicle cabin may not be ensured.

In addition, when a drive motor and auxiliary devices, which are high-voltage components, are subjected to an impact applied from the frunk, the safety of a passenger and a rescuer may be impaired due to secondary damage such as an electric shock.

Thus, in the structure described in JP-A No. 2021-146741, the frunk is deformed by the impact in the event of the collision of the vehicle, and the impact is absorbed, thereby suppressing the rearward movement of the frunk.

SUMMARY

An aspect of the disclosure provides a vehicle front structure for a vehicle. The vehicle front structure includes side frames in a left and right pair, an upper support, upper frames in a pair, a hood, and a frunk. The upper support is positioned above the side frames and configured to protect a radiator. The upper sides are fastened respectively to left and right ends of the upper support. The upper frames are fastened to respective rear ends of the upper sides. The hood is configured to open and close a housing space positioned on a front side of a vehicle cabin. The frunk is disposed in the housing space and attached to the side frames. Bottom surface side beads are provided at a bottom surface of the frunk to bend the bottom surface so as to protrude downward when an impact from a front side is applied. Side surface side beads are provided respectively at side surfaces on both left and right sides of the frunk to bend the side surfaces so as to protrude outward in a left-right direction when the impact from the front side is applied. A position of each of the bottom surface side beads and a corresponding one of the side surface side beads in a front-rear direction coincides with a position of a fastening point between a corresponding one of the upper sides and a corresponding one of the upper frames.

An aspect of the disclosure provides a vehicle front structure for a vehicle. The vehicle front structure includes side frames in a left and right pair, an upper support, upper sides in a pair, upper frames in a pair, a hood, and a frunk. The upper support positioned above the side frames and configured to protect a radiator. The upper sides are fastened respectively to left and right ends of the upper support. The upper frames are fastened to respective rear ends of the upper sides. The hood is configured to open and close a housing space positioned on a front side of a vehicle cabin. The frunk is disposed in the housing space and attached to the side frame. Bottom surface side beads are provided at a bottom surface of the frunk to bend the bottom surface so as to protrude downward when an impact from a front side is applied. Side surface side beads are provided respectively at side surfaces on both left and right sides of the frunk to bend the side surface so as to protrude outward in a left-right direction when an impact from the front side is applied. A position of each of the bottom surface side beads and a corresponding one of the side surface side beads in a front-rear direction coincides with a position of an attachment point of the frunk to a corresponding one of the side frames.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Various stored items may be stored in the frunk accommodated in the housing space. For example, when a stored item having a large volume and a heavy weight such as a spare tire is stored, the stored item may hinder deformation of the frunk in the event of a collision. In this case, the impact may not be sufficiently absorbed and the frunk may be moved rearward, making it impossible to sufficiently ensure the safety of the passenger or the like. Further, the deformation of each frame of the vehicle body on the front side of the vehicle cabin is inhibited by the frunk, the impact may not be sufficiently absorbed, and the safety of the passenger may not be sufficiently ensured.

Accordingly, it is desirable to improve safety by sufficiently absorbing impact regardless of the stored item stored in the frunk in the event of the collision of the vehicle.

A vehicle front structure according to an embodiment of the disclosure will be described below with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

<Schematic Configuration of Vehicle>

Figure 1:
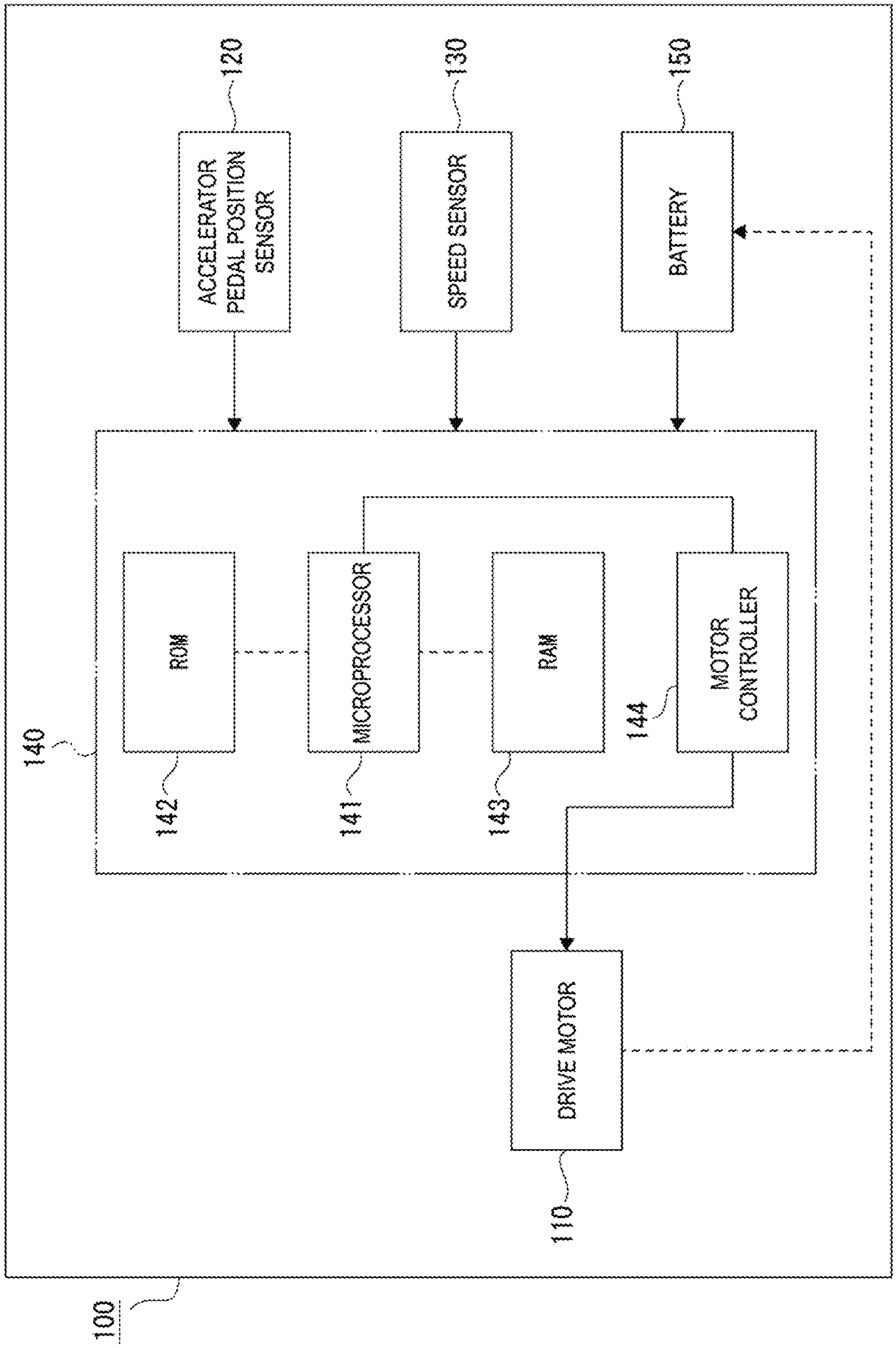
FIG. 1 illustrates an embodiment of a vehicle front structure of the disclosure together with FIGS. 2 to 9, and the diagram illustrates a schematic configuration of a vehicle.

First, a schematic configuration of a vehicle will be described (see FIG. 1).

A vehicle 100 is, for example, an electric vehicle that travels only by electric power, and includes a drive motor 110, an accelerator pedal position sensor 120, a speed sensor 130, and a controller 140. However, the vehicle 100 may be a hybrid vehicle that travels by at least one of fuel (gasoline) power and electric power, or may be a vehicle that travels only by fuel power.

The drive motor 110 is accommodated in a space on a front side of a vehicle cabin and is used as a power source of the vehicle 100. When the vehicle 100 is the hybrid vehicle, two travel modes are set, that is, a hybrid travel mode using both the engine and the drive motor 110 as the power and a motor travel mode using only the drive motor 110 as the power, and the two travel modes are switched according to a travel condition or the like. In addition, when the vehicle 100 is a vehicle that travels using only the fuel power, the engine is used as the power source of the vehicle 100.

The accelerator pedal position sensor 120 detects an accelerator pedal position corresponding to a driving force of the vehicle 100 requested by a driver who drives the vehicle, that is, a depressed amount of an accelerator pedal by the driver. The accelerator pedal position detected by the accelerator pedal position sensor 120 is output as a detected signal to the controller 140.

The speed sensor 130 detects a speed of the vehicle 100. The speed of the vehicle 100 detected by the speed sensor 130 is output as a detected signal to the controller 140.

In one embodiment, the controller 140 may serve to integrally control an operation of each member in the vehicle 100 and perform various calculation processes. The controller 140 includes a microprocessor 141 performing calculation, a read only memory (ROM) 142 storing a program or the like for causing the microprocessor 141 to execute each process, a random access memory (RAM) 143 storing various data such as calculation results, an interface for inputting or outputting data, and the like.

The controller 140 includes a motor controller 144 controlling the drive motor 110. In one embodiment, the motor controller 144 may serve to control, for example, a driving operation of wheels of the vehicle 100 by the drive motor 110, a regenerative operation in the drive motor 110, and the like.

When the vehicle 100 is the hybrid vehicle or the vehicle that travels only by the fuel power, the controller 140 is provided with an engine controller controlling the engine. When the vehicle 100 is the hybrid vehicle, the controller 140 is also provided, in addition to the engine controller, with a mode switcher switching between a travel mode using the drive motor 110 and a travel mode using the engine.

A battery 150 is accommodated in a trunk room or the like of the vehicle 100. The battery 150 includes a battery module storing electric power used in the vehicle 100, for example, electric power used in the controller 140, each member operated by electric power in the vehicle 100, and various types of lighting provided in the vehicle 100, and the like, in addition to electric power used in the drive motor 110. As a battery of the battery module, for example, a secondary battery such as a nickel hydrogen battery or a lithium ion battery is used. The battery 150 stores, for example, regenerative electric power supplied from the drive motor 110 in addition to electric power (charging electric power) obtained by charging from outside the vehicle 100.

<Vehicle Front Structure and Other Members>

Next, the vehicle front structure and the like will be described (see FIGS. 2 to 9).

Figure 2:
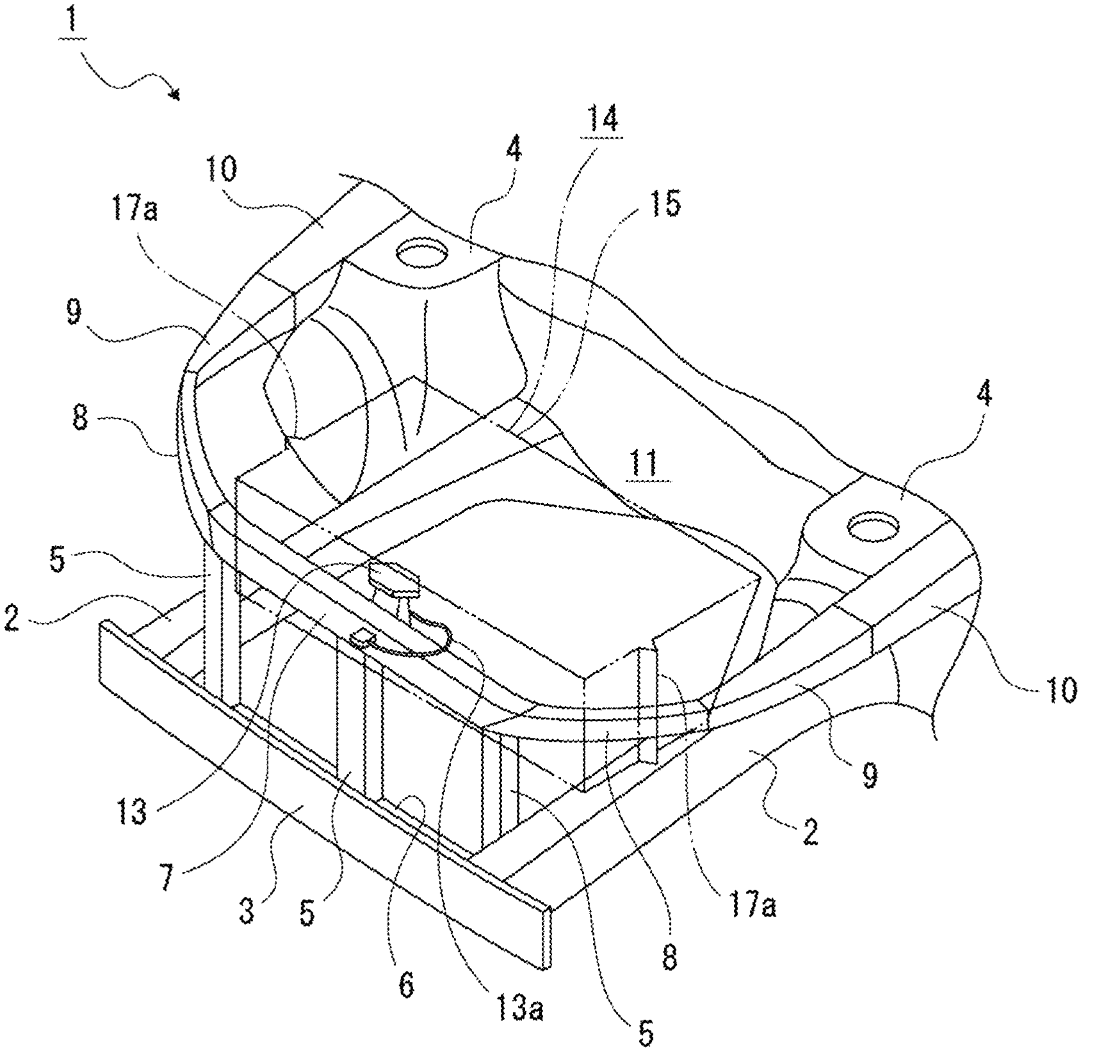
FIG. 2 is a perspective view illustrating a part of the vehicle front structure.
Figure 3:
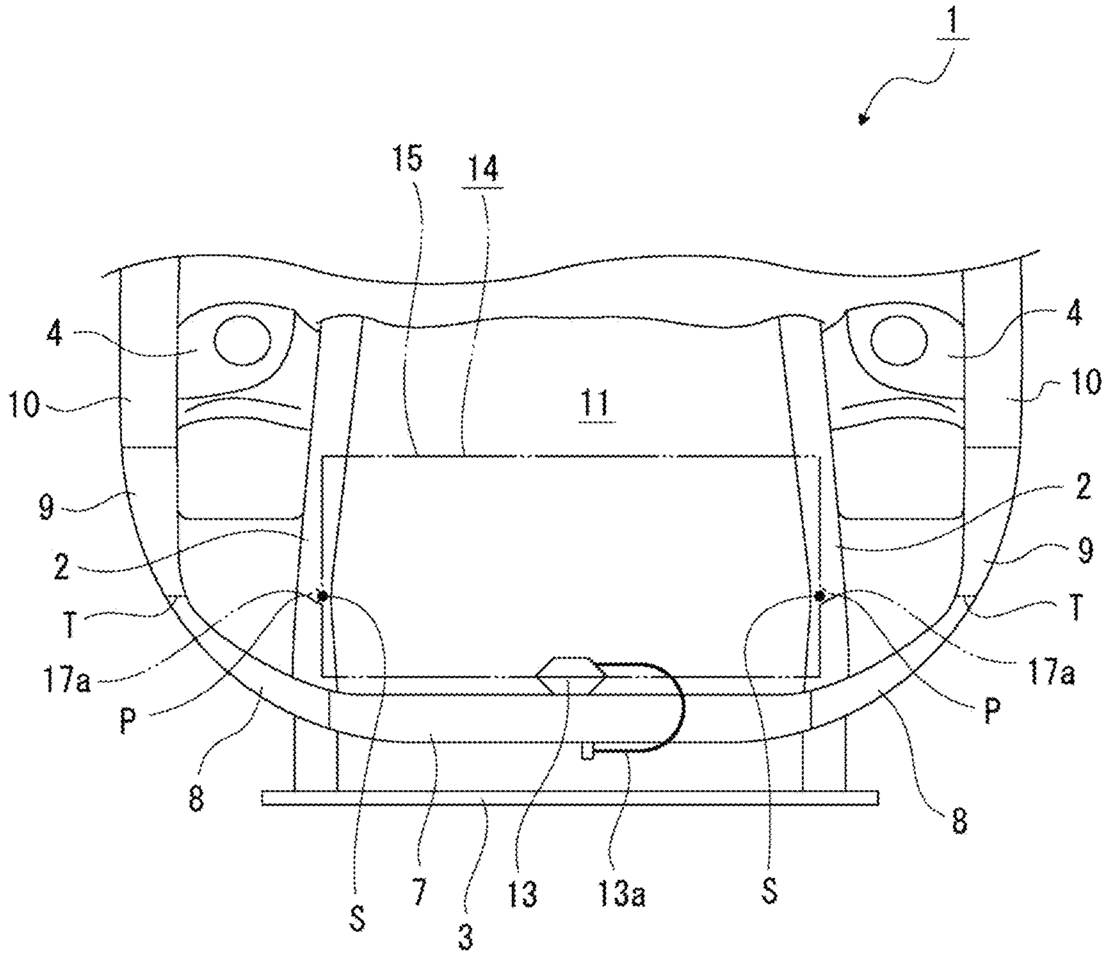
FIG. 3 is a plan view illustrating a part of the vehicle front structure.
Figure 4:
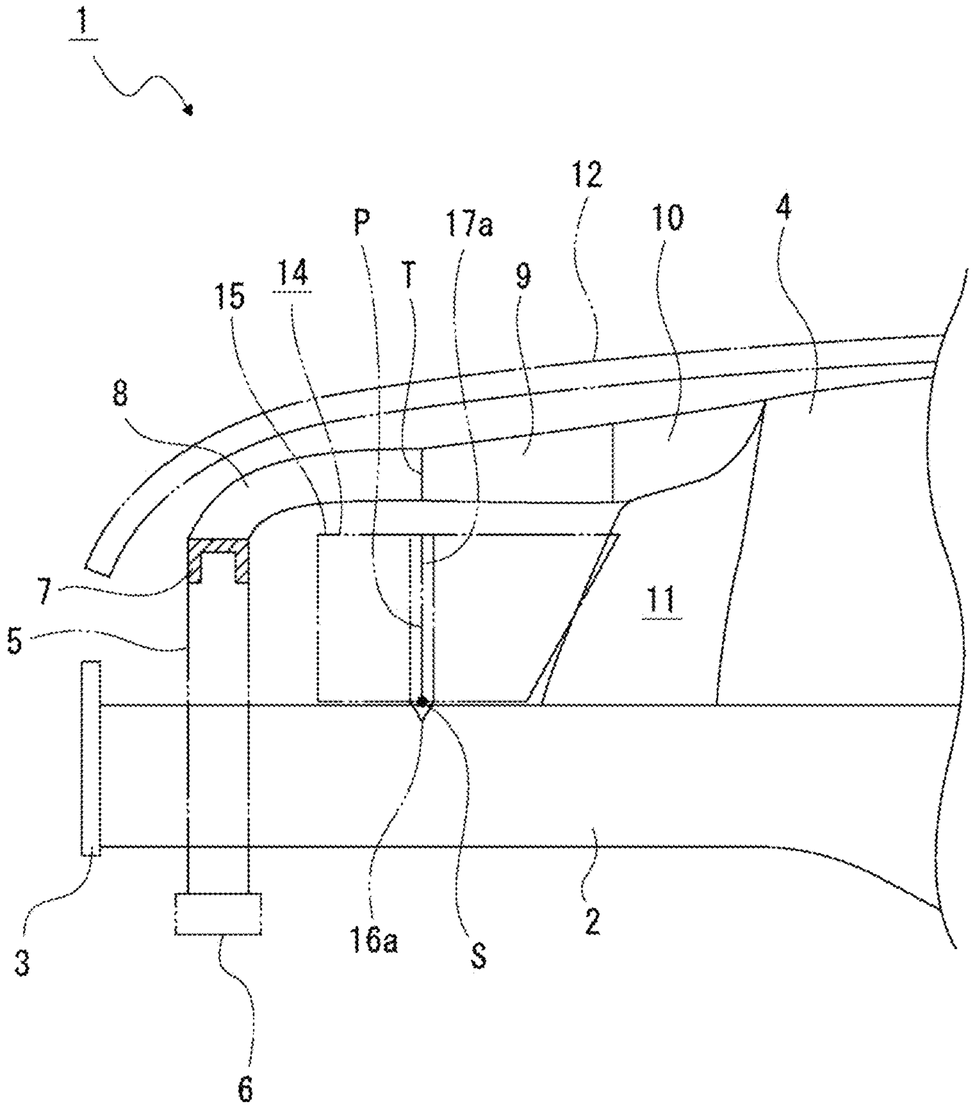
FIG. 4 is a side view illustrating a part of the vehicle front structure.
Figure 5:
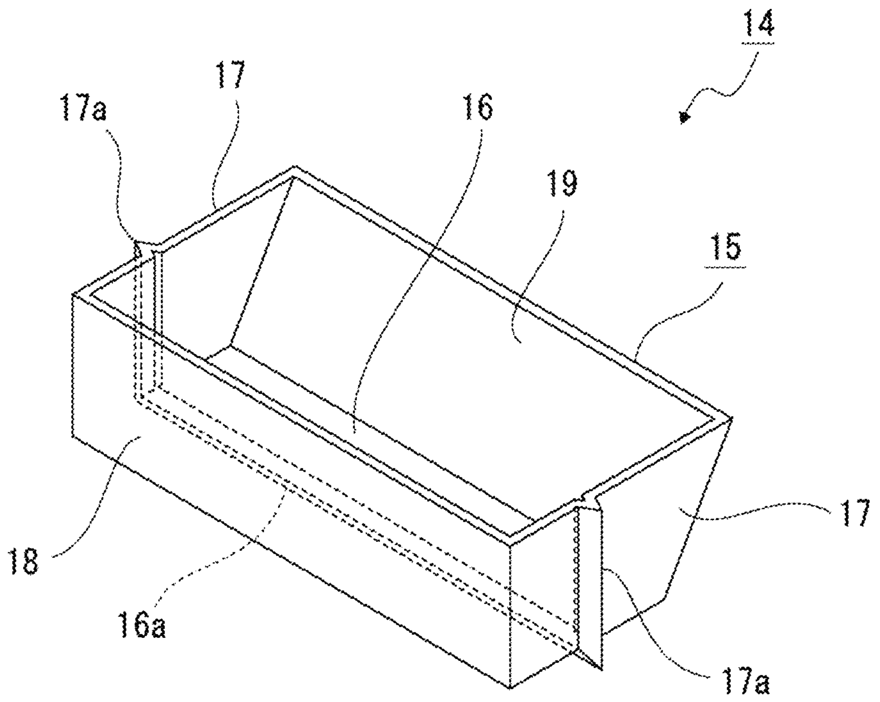
FIG. 5 is a perspective view of a frunk.
Figure 6:
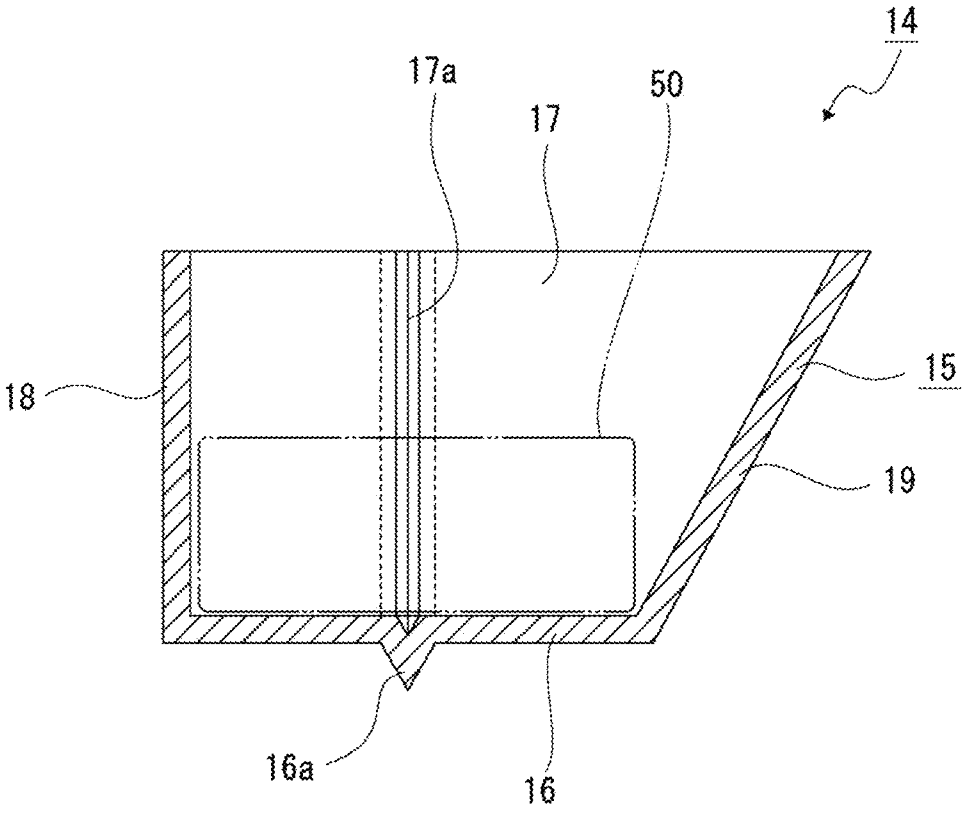
FIG. 6 is a cross-sectional view of the frunk.

A vehicle front structure 1 includes a side frame 2, a bumper beam 3, a strut tower 4, and the like (see FIGS. 2 to 4).

A pair of the side frames 2 are provided so as to be spaced apart from each other in the left-right direction and have a shape extending in the front-rear direction. The bumper beam 3 is fastened to a front end of the side frame 2 and has a shape extending in the left-right direction. The strut tower 4 is fastened to an outer side of a rear end of the side frame 2, and has a shape protruding upward from the side frame 2. The strut tower 4 is a portion having high strength and in one embodiment, may serve to protect the vehicle cabin together with the side frame 2 in the event of a collision.

Support members 5 extending up and down are provided on a rear side of the bumper beam 3 so as to be spaced apart from each other in the left-right direction. A lower beam 6 extending in the left-right direction is fastened to lower ends of the support members 5, and an upper support 7 extending in the left-right direction is fastened to upper ends of the support members 5. Left and right ends of the lower beam 6 may be each fastened to portions on the front side of the side frames 2, or may be fastened to the portions on the front side of the side frames 2 via other members.

Upper sides 8 are fastened to both left and right ends of the upper support 7, and the upper sides 8 are inclined so as to be displaced rearward toward the outer side in the left-right direction. An upper frame 9 extending in the front-rear direction is fastened to a rear end of the upper side 8. A coupling frame 10 extending in the front-rear direction is fastened to a rear end of the upper frame 9, and an upper end of the strut tower 4 is fastened to an inner side of the coupling frame 10.

The vehicle front structure 1 includes a housing space 11 surrounded by members such as the side frame 2. The housing space 11 is a space on a lower side of a hood (bonnet) 12, and the drive motor 110 is accommodated in the housing space 11 at a position on a lower side of the side frame 2. The drive motor 110 is accommodated at a position closer to a rear side in the housing space 11.

A radiator (not illustrated) is disposed at a front end of the housing space 11. The radiator may serve as a heat exchanger. The radiator is disposed between the lower beam 6 and the upper support 7 and held by the support members 5. The radiator is protected by the support members 5, the lower beam 6, and the upper support 7.

A hood lock 13 is attached to the upper support 7. The hood lock 13 may serve to lock the hood 12 in a closed state by being engaged with a locking engagement member (not illustrated) provided at the hood 12.

The hood lock 13 has a double lock mechanism and is coupled by a hood wire 13*a* to a release lever (not illustrated) provided in the vehicle cabin. Thus, when the release lever is operated, the hood lock 13 is operated via the hood wire 13*a,* and a first locked state to the hood 12 by the hood lock 13 is released. In a state where the first locked state is released, by inserting a finger into a gap existing on a lower side of the hood 12 and operating the hood lock 13, a second locked state with respect to the hood 12 by the hood lock 13 is released, and the hood 12 can be lifted and opened.

A frunk 14 is accommodated in the housing space 11. The frunk 14 is accommodated at a position above the drive motor 110 and close to the front end in the housing space 11, and includes, for example, only a storage case 15 that is opened upward (see FIGS. 5 and 6). However, the frunk 14 may include, in addition to the storage case 15, a lid (not illustrated) that opens and closes the opening of the storage case 15.

The frunk 14 includes a bottom surface 16 having a rectangular shape and facing up and down, a pair of side surfaces 17 each being continuous with left and right ends of the bottom surface 16, a front surface 18 disposed to be continuous with a front end of the bottom surface 16, and a rear surface 19 disposed to be continuous with a rear end of the bottom surface 16, and the rear surface 19 is inclined downward toward the front. Thus, the rear surface 19 is provided as an inclination with a rear side displaced upward.

The bottom surface 16 is formed with a bottom surface side bead 16*a* at an intermediate portion in the front-rear direction. The bottom surface side bead 16*a* has a shape having a V-groove protruding downward and opening upward, extends in the left-right direction, and is positioned between left and right ends of the bottom surface 16.

In the event of collision (frontal collision) of the vehicle 100, the frunk 14 is subjected to an impact from the front due to the collision, but the bottom surface 16 is bent and deformed so as to protrude downward at the bottom surface side bead 16*a*.

The side surface 17 is formed with a side surface side bead 17*a* at an intermediate portion in the front-rear direction. The side surface side bead 17*a* has a shape having a V-groove protruding outward in the left-right direction and opening inward in the left-right direction, extends in the up-down direction, and is positioned between the upper and lower ends of the side surface 17. A position of the side surface side bead 17*a* in the front-rear direction on the side surface 17 coincides with a position of the bottom surface side bead 16*a* in the front-rear direction on the bottom surface 16. Thus, the lower ends of a pair of the side surface side beads 17*a* are each continuous with the left and right ends of the bottom surface side bead 16*a*.

In the event of collision (frontal collision) of the vehicle 100, the frunk 14 is subjected to an impact from the front due to the collision, but the side surface 17 is bent and deformed to protrude outward in the left-right direction at the side surface side bead 17*a*.

The bottom surface 16 of the frunk 14 is attached to the pair of side frames 2 by bolts or the like. In a state where the frunk 14 is attached to the side frames 2, a position P of the bottom surface side bead 16*a* and the side surface side bead 17*a* in the front-rear direction coincides with a position T of a fastening point between the upper side 8 and the upper frame 9 in the front-rear direction (see FIGS. 3 and 4). Thus, the position T of the fastening point is located just beside the position P.

Further, in the vehicle front structure 1, the position P of the bottom surface side bead 16*a* and the side surface side bead 17*a* in the front-rear direction coincides with an attachment point S of the frunk 14 to the side frame 2.

Figure 7:
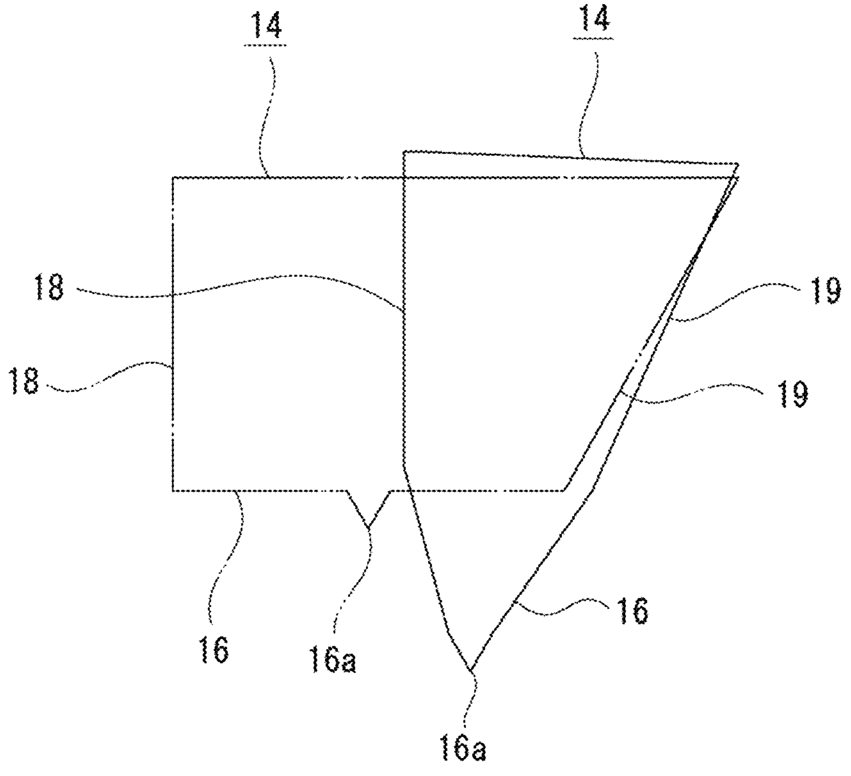
FIG. 7 is a side view conceptually illustrating a state in which the frunk is deformed by impact from the front.
Figure 8:
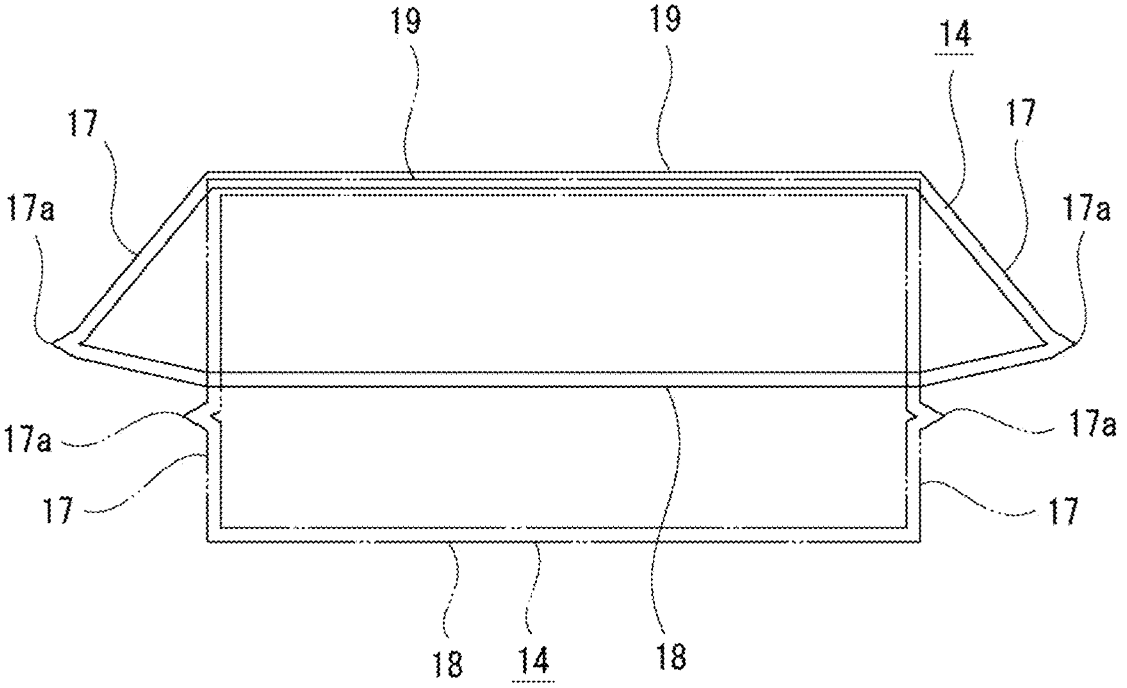
FIG. 8 is a plan view conceptually illustrating a state in which the frunk is deformed by impact from the front.

In the vehicle 100 configured as described above, in the event of the collision (frontal collision), an impact from the front is applied to the frunk 14, and the frunk 14 is deformed by the applied impact (see FIGS. 7 and 8). In FIGS. 7 and 8, the frunk 14 before deformation is indicated by a two dot chain line, and the frunk 14 after deformation is indicated by a solid line.

At this time, the bottom surface 16 is easily deformed to protrude downward at the bottom surface side bead 16*a,* and the side surface 17 is easily deformed so as to protrude outward in the left-right direction by the side surface side bead 17*a*. Thus, even when a stored item 50 is stored inside the frunk 14, the stored item 50 does not hinder the deformation of the bottom surface 16 and the side surface 17, and the front surface 18 is crushed and deformed by the impact, so that the bottom surface 16 is bent and deformed so as to protrude downward at the bottom surface side bead 16*a,* and the side surface 17 is bent and deformed so as to protrude outward in the left-right direction at the side surface side bead 17*a*.

In this way, in the event of the collision of the vehicle 100, the frunk 14 is reliably deformed regardless of the presence of the stored item 50 in the frunk 14 and the size, weight, and the like of the stored item 50. Thus, a sufficient deformation stroke in the frunk 14 is ensured, and the rear surface 19 of the frunk 14 is less likely to be moved rearward. Thus, the frunk 14 is brought into a state of being less likely to be moved in a direction approaching the vehicle cabin. In addition, since the frunk 14 is deformed with the sufficient stroke, a sufficient deformation stroke is ensured in each frame such as the side frame 2 and the upper support 7 which are positioned on the front side of the vehicle cabin, and each frame is deformed without being hindered by the frunk 14.

As described above, the frunk 14 is accommodated at the position above the drive motor 110 and close to the front end in the housing space 11, and even when the frunk 14 is moved rearward, since a housing position of the frunk 14 is a position separated forward from the vehicle cabin, the influence of the frunk 14 on the vehicle cabin is reduced.

In the event of the collision of the vehicle 100, the upper support 7 and the like are crushed in addition to the bumper beam 3 and the lower beam 6 in the vehicle body, and the upper side 8 and the upper frame 9 are bent with reference to the position T of the fastening point between the upper side 8 and the upper frame 9.

At this time, in the vehicle front structure 1, the position P of the bottom surface side bead 16*a* and the side surface side bead 17*a* in the front-rear direction coincides with the position T of the fastening point between the upper side 8 and the upper frame 9.

Thus, when the frunk 14 is subjected to an impact from the front due to collision of the vehicle 100, a portion of the vehicle body to be bent and a portion of the frunk 14 to be bent coincide with each other, so the frunk 14 is deformed in synchronization with the deformation of the vehicle body in the event of the collision of the vehicle 100. Thus, the behavior at the time of absorbing the impact is stabilized, and the impact can be sufficiently absorbed.

Further, in the event of the collision of the vehicle 100, the side frame 2 may be crushed in the vehicle body and a force in a direction in which the side frame 2 is bent is applied to the side frame 2.

At this time, in the vehicle front structure 1, the position P of the bottom surface side bead 16*a* and the side surface side bead 17*a* in the front-rear direction coincides with the attachment point S of the frunk 14 to the side frame 2.

Thus, the side frame 2 and the frunk 14 are deformed in synchronization with each other at the same position when the impact from the front is applied to the frunk 14 due to the collision of the vehicle 100. Thus, the behavior at the time of absorbing the impact is stabilized, and the impact can be further sufficiently absorbed.

Furthermore, as described above, the rear surface 19 of the frunk 14 is inclined downward toward the front, and the rear surface 19 is provided as the inclination with a rear side displaced upward.

Figure 9:
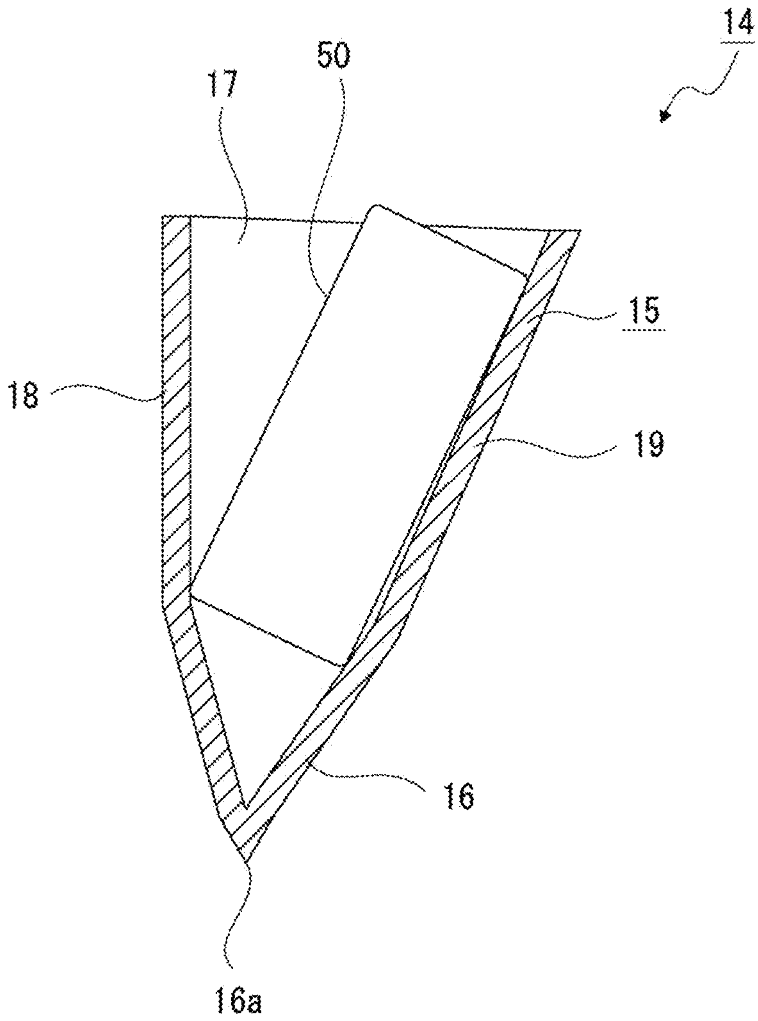
FIG. 9 is a cross-sectional view illustrating a state in which a stored item stored in the frunk is guided by a rear surface and moved upward by impact from the front.

Thus, when the impact from the front is applied to the frunk 14 due to the collision of the vehicle 100, the stored item 50 is pressed rearward by the front surface 18 of the frunk 14, and the stored item 50 is guided by the inclined rear surface 19 and moved upward (see FIG. 9).

Thus, the frunk 14 is less likely to be moved rearward, and the safety for the passenger can be further improved.

<Conclusion>

As described above, in the vehicle front structure 1 of the vehicle 100, the frunk 14 disposed in the housing space 11 and attached to the pair of side frames 2 is provided, and the bottom surface 16 of the frunk 14 includes the bottom surface side bead 16*a* for bending the bottom surface 16 so as to protrude downward when the impact from the front is applied.

Thus, since the direction in which the bottom surface 16 is bent by the bottom surface side bead 16*a* when the impact from the front is applied to the frunk 14 due to the collision of the vehicle 100 is set to a direction opposite to a side on which the stored item 50 stored in the frunk 14 is present, the frunk 14 is deformed with a sufficient stroke regardless of the size and weight of the stored item 50, and deformation of each frame of the vehicle body in the front of the vehicle 100 is less likely to be hindered by the frunk 14, and the impact is sufficiently absorbed regardless of the stored item 50 stored in the frunk 14 in the event of the collision of the vehicle 100, thereby improving safety.

In addition, each of the side surfaces 17 on both left and right sides of the frunk 14 includes the side surface side bead 17*a* for bending the side surface 17 so as to protrude outward in the left-right direction when the impact from the front is applied.

Thus, when the impact from the front is applied to the frunk 14 due to the collision of the vehicle 100, the side surfaces 17 on both left and right sides of the frunk 14 are bent so as to protrude outward in the left-right direction at the side surface side beads 17*a*, so the impact is absorbed by the frunk 14 regardless of the size and weight of the stored item 50 stored in the frunk 14, and the frunk 14 and the stored item 50 are less likely to be moved rearward, and the safety for the passenger can be further improved.

Further, since the frunk 14 is accommodated above the drive motor 110, the drive motor 110 is not subjected to an impact from the frunk 14 in the event of the collision of the vehicle 100, secondary damage such as an electric shock is suppressed, and the safety of the vehicle 100 can be further improved.

The frunk 14 is accommodated at the position above the drive motor 110 and close to the front end in the housing space 11.

Thus, in the state where the hood 12 is open, the frunk 14 is located at a position close to the operator, thereby improving workability and speeding up the work relating to loading and unloading the stored item to and from the frunk 14.

According to the disclosure, since the direction in which the bottom surface is bent by the bottom surface side bead when the impact from the front is applied to the frunk due to the collision of the vehicle is set to a direction opposite to a side on which the stored item stored in the frunk is present, the frunk is deformed with a sufficient stroke regardless of the size and weight of the stored item, and deformation of each frame of the vehicle body in the front of the vehicle is less likely to be hindered by the frunk, and the impact is sufficiently absorbed regardless of the stored item stored in the frunk in the event of the collision of the vehicle, thereby improving safety.

The invention claimed is:

1. A vehicle front structure for a vehicle, the vehicle front structure comprising:

side frames in a left and right pair;

an upper support positioned above the side frames and configured to protect a radiator;

upper sides in a pair, the upper sides being fastened respectively to left and right ends of the upper support;

upper frames in a pair, the upper frames being fastened to respective rear ends of the upper sides;

a hood configured to open and close a housing space positioned on a front side of a vehicle cabin; and a frunk disposed in the housing space and attached to the side frames, wherein bottom surface side beads are provided at a bottom surface of the frunk to bend the bottom surface so as to protrude downward when an impact from a front side is applied, side surface side beads are provided respectively at side surfaces on both left and right sides of the frunk to bend the side surfaces so as to protrude outward in a left-right direction when the impact from the front side is applied, and a position of each of the bottom surface side beads and a corresponding one of the side surface side beads in a front-rear direction coincides with a position of a fastening point between a corresponding one of the upper sides and a corresponding one of the upper frames.

2. A vehicle front structure for a vehicle, the vehicle front structure comprising:

side frames in a left and right pair;

an upper support positioned above the side frames and configured to protect a radiator;

upper sides in a pair, the upper sides being fastened respectively to left and right ends of the upper support;

upper frames in a pair, the upper frames being fastened to respective rear ends of the upper sides;

a hood configured to open and close a housing space positioned on a front side of a vehicle cabin; and a frunk disposed in the housing space and attached to the side frames, wherein bottom surface side beads are provided at a bottom surface of the frunk to bend the bottom surface so as to protrude downward when an impact from a front side is applied, side surface side beads are provided respectively at side surfaces on both left and right sides of the frunk to bend the side surface so as to protrude outward in a left-right direction when an impact from the front side is applied, and a position of each of the bottom surface side beads and a corresponding one of the side surface side beads in a front-rear direction coincides with a position of an attachment point of the frunk to a corresponding one of the side frames.

3. The vehicle front structure according to claim 1, wherein a rear surface of the frunk is inclined downward toward the front side.

4. The vehicle front structure according to claim 2, wherein a rear surface of the frunk is inclined downward toward the front side.

* * * * *